(12) United States Patent
Kim et al.

(10) Patent No.: US 6,976,799 B2
(45) Date of Patent: Dec. 20, 2005

(54) KEYBOARD OF A PERSONAL DIGITAL ASSISTANT

(75) Inventors: Young-ki Kim, Gyunggi-do (KR); Kwang-hwan Cha, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/385,744

(22) Filed: Mar. 12, 2003

(65) Prior Publication Data

US 2004/0005184 A1 Jan. 8, 2004

(30) Foreign Application Priority Data

Jul. 3, 2002 (KR) ................ 2002-38466

(51) Int. Cl.[7] ................ B41J 5/08; B41J 3/46
(52) U.S. Cl. ................ 400/472; 400/83; 361/680; 361/681; 361/683
(58) Field of Search ................ 400/472, 83; 361/681, 361/680, 683; 345/168, 169, 82; 341/22; 439/638, 31; 16/261, 254, 303

(56) References Cited

U.S. PATENT DOCUMENTS

| | | | |
|---|---|---|---|
| 5,268,817 A | * 12/1993 | Miyagawa et al. | 361/681 |
| 5,448,446 A | * 9/1995 | Honda et al. | 361/680 |
| 5,457,453 A | * 10/1995 | Chiu et al. | 341/22 |
| 5,494,447 A | * 2/1996 | Zaidan | 439/31 |
| 5,600,580 A | * 2/1997 | Honjo et al. | 361/681 |
| 5,638,257 A | * 6/1997 | Kumar et al. | 361/680 |
| 5,644,469 A | * 7/1997 | Shioya et al. | 361/681 |
| 5,657,258 A | * 8/1997 | Grewe et al. | 361/681 |
| 5,708,560 A | * 1/1998 | Kumar et al. | 361/680 |
| 5,880,929 A | * 3/1999 | Bhatia | 361/687 |
| 5,941,648 A | * 8/1999 | Robinson et al. | 400/82 |
| 5,949,643 A | * 9/1999 | Batio | 361/681 |
| 5,996,956 A | * 12/1999 | Shawver | 248/309.1 |
| 6,108,200 A | * 8/2000 | Fullerton | 361/686 |
| 6,151,012 A | * 11/2000 | Bullister | 345/168 |
| 6,256,193 B1 | * 7/2001 | Janik et al. | 361/683 |
| 6,317,313 B1 | * 11/2001 | Mosgrove et al. | 361/680 |
| 6,359,776 B2 | * 3/2002 | Carlson | 361/683 |

(Continued)

FOREIGN PATENT DOCUMENTS

JP 59-104254 7/1984

(Continued)

OTHER PUBLICATIONS

Merriam-Webster's Collegiate Dictionary, tenth edition, 1998, , pp 548-549.*

(Continued)

*Primary Examiner*—Andrew H. Hirshfeld
*Assistant Examiner*—Wasseem H. Hamdan
(74) *Attorney, Agent, or Firm*—Staas & Halsey LLP (57) ABSTRACT

A keyboard attached to a personal digital assistant (PDA) set having: a hinge unit including a connector to transfer a keyboard input signal to the PDA, and upper and lower hinge covers; a connection unit placed inside of the hinge unit, and can be attached in the front direction or the back direction to the PDA; and a keyboard body connected with the hinge unit, folded and unfolded about the hinge unit, having a typing board on an upper side and a front panel controller (FPC) keypad to input a key pressed on the typing board. Therefore, the keyboard of the PDA can not only be attached in the front direction or the back direction to the PDA, but also separated from the PDA, thus making the usage and maintenance of the keyboard convenient.

9 Claims, 6 Drawing Sheets

U.S. PATENT DOCUMENTS

| | | | |
|---|---|---|---|
| 6,392,871 B1 * | 5/2002 | Yanase | 361/681 |
| 6,421,235 B2 * | 7/2002 | Ditzik | 361/683 |
| 6,457,996 B1 * | 10/2002 | Shih | 439/638 |
| 6,492,974 B1 * | 12/2002 | Nobuchi et al. | 345/156 |
| 6,498,720 B2 * | 12/2002 | Glad | 361/680 |
| 6,525,928 B1 * | 2/2003 | Madsen et al. | 361/683 |
| 6,581,420 B1 * | 6/2003 | Ling et al. | 70/58 |
| 6,614,649 B1 * | 9/2003 | Wang | 361/680 |
| 6,636,204 B2 * | 10/2003 | Santoh | 345/179 |
| 6,648,432 B2 * | 11/2003 | Huang | 312/327 |
| 6,690,353 B2 * | 2/2004 | Chang | 345/156 |
| 6,734,809 B1 * | 5/2004 | Olodort et al. | 341/22 |
| 6,778,382 B2 * | 8/2004 | Yim | 361/681 |
| 6,781,819 B2 * | 8/2004 | Yang et al. | 361/680 |
| 2001/0030850 A1 * | 10/2001 | Ditzik | 361/683 |
| 2002/0050980 A1 * | 5/2002 | Furuki et al. | 345/168 |
| 2002/0163778 A1 * | 11/2002 | Hazzard et al. | 361/683 |
| 2002/0186206 A1 * | 12/2002 | Lee et al. | 345/168 |
| 2002/0186525 A1 * | 12/2002 | Singh | 361/680 |
| 2003/0017746 A1 * | 1/2003 | Lee | 439/638 |
| 2003/0052857 A1 * | 3/2003 | Pappas | 345/156 |
| 2003/0095380 A1 * | 5/2003 | Chen et al. | 361/686 |
| 2003/0137803 A1 * | 7/2003 | Loo | 361/680 |
| 2003/0150756 A1 * | 8/2003 | Kajiya | 206/320 |

FOREIGN PATENT DOCUMENTS

| | | | | |
|---|---|---|---|---|
| JP | 4-55619 | | 5/1992 | |
| JP | 5-297980 | | 11/1993 | |
| JP | 06-222857 | | 8/1994 | |
| JP | 9-34370 | | 2/1997 | |
| JP | 2000-10654 | | 1/2000 | |
| JP | 2003-60758 | * | 8/2001 | H04M 1/02 |
| JP | 2001-331238 | | 11/2001 | |

OTHER PUBLICATIONS

Chambers Dictionary of Science and Technology, 1999, p562.*

* cited by examiner

KEYBOARD OF A PERSONAL DIGITAL ASSISTANT

CROSS-REFERENCE TO RELATED APPLICATIONS

This application claims the benefit of Korean Application No. 2002-38466, filed Jul. 3, 2002, in the Korean Intellectual Property Office, the disclosure of which is incorporated herein by reference.

BACKGROUND OF THE INVENTION

1. Field of the Invention

The present invention relates to keyboard, and more particularly, to a keyboard of a PDA (personal digital assistant), which is attached to a PDA in a front direction when in use, and folded in a back direction to the back of the PDA or removed from the PDA when not in use, i.e., when a user uses only a screen of the PDA.

In the front direction, the keyboard is placed in front of the screen of the PDA, and in the back direction, the keyboard is placed in the back of the PDA. The directions will be used in the same meaning through this specification.

2. Description of the Related Art

A conventional keyboard of a PDA (personal digital assistant) is not removable from the PDA as the keyboard is fixed to the PDA. Another case is that the keyboard is separated from the PDA and carried, and when a user needs to use the keyboard, the user attaches the keyboard to the PDA in the front direction.

The first case has a disadvantage that the user cannot separate the keyboard when the user does not want the keyboard, and the second has a disadvantage that the user is required to carry the keyboard all the time while most of the keyboards are not small enough to carry. Moreover, the conventional keyboard of the PDA is inconvenient to use while moving and it bothers the user to change from the screen to the keyboard and vice versa.

SUMMARY OF THE INVENTION

Accordingly, it is an object of the present invention to provide a keyboard of a PDA, which can be attached in the front direction and folded or unfolded. In another aspect of the invention, the keyboard can be attached in the back direction and folded up to the back of the PDA. Also, the keyboard can be separated from the PDA and carried separately.

Furthermore, another aspect of the present invention is to provide a keyboard that is easily attached and separated to and from the PDA.

It is yet another aspect of the present invention to provide a keyboard that can be folded and unfolded for 360° in the connection to the PDA. Accordingly, the keyboard is easily used and maintained.

Additional objects and advantages of the invention will be set forth in part in the description which follows and, in part, will be obvious from the description, or may be learned by practice of the invention.

The foregoing and/or other objects of the present invention are achieved by providing a keyboard attached to a PDA set, comprising: a hinge unit having a connector to transmit a keyboard input signal to the PDA, and upper and lower hinge covers; a connection unit placed inside of the hinge unit attached in the front direction or the back direction to the PDA; and a keyboard body connected with the hinge unit, folded and unfolded with respect to the hinge unit, having a typing board on an upper side and a keypad formed therein to input a key pressed on the typing board.

It is an aspect of the present invention that the connection unit comprises a bracket hinge inserted into the PDA in order to fix the hinge unit, a spring to elastically bias the bracket hinge toward a side so that the bracket hinge is automatically locked to the PDA when the bracket hinge is inserted into the PDA, and an ejector to release the lock of the bracket hinge by compressing the spring.

It is an aspect of the invention that the connector is a pin contact connector connected with the keypad.

It is another aspect of the invention that the upper hinge cover has a guide protrusion to inform an attaching position to the PDA.

It is yet another aspect of the invention that the keyboard further comprises a hinge pipe to prevent the keyboard body from being worn by the friction with the fixed hinge unit when the keyboard body is folded and unfolded with respect to the hinge unit.

The foregoing and/or other objects of the present invention may also be achieved by providing a keyboard attached to a PDA set, comprising: a hinge unit having a connector to provide a keyboard input signal to the PDA, and upper and lower hinge covers; a connection unit placed inside of the hinge unit and attachable in the front direction or the back direction to the PDA; a keyboard body having a typing board and a keypad formed therein to input a key pressed on the typing board; and a keyboard rotation unit to connect the hinge unit and the keyboard body as one side of the rotation unit is connected with the hinge unit and the other side of the rotation unit is connected with the keyboard body, and the keyboard rotation unit having a flexibility to fold and unfold the keyboard body for 360° with respect to the hinge unit.

It is an aspect of the invention that the keyboard body is made of plastic and the keyboard rotation unit is made of leather having appropriate flexibility and durability.

It is another aspect of the invention that the keyboard rotation unit is made of cloth.

It is yet another aspect of the invention that the connector is a pin contact connector connected with the keypad through a connection member.

It is still another aspect of the invention that the connection member comprises a conductive tape placed therein and a protective film to wrap and protect the conductive tape.

It yet another aspect of the invention that the protective film is urethane foam.

It is still another aspect of the invention that the lower hinge cover has a guide protrusion to inform an attaching position to the PDA.

It is still another aspect of the invention that the connection unit comprises a hook hinge to be inserted into the PDA and locked, and a spring or a plate spring to lock the hook hinge by pushing the hook hinge to a side.

It is still another aspect of the invention that a magnet is disposed at right and left corners of the keyboard body in order to allow the keyboard body to be attached to the PDA when the keyboard body is folded or rotated by 360° to be contacted with the screen of the PDA or with the back of the PDA.

BRIEF DESCRIPTION OF THE DRAWINGS

These and other objects and advantages of the invention will become apparent and more readily appreciated from the following description of the embodiments, taken in conjunction with the accompanying drawings of which.

DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
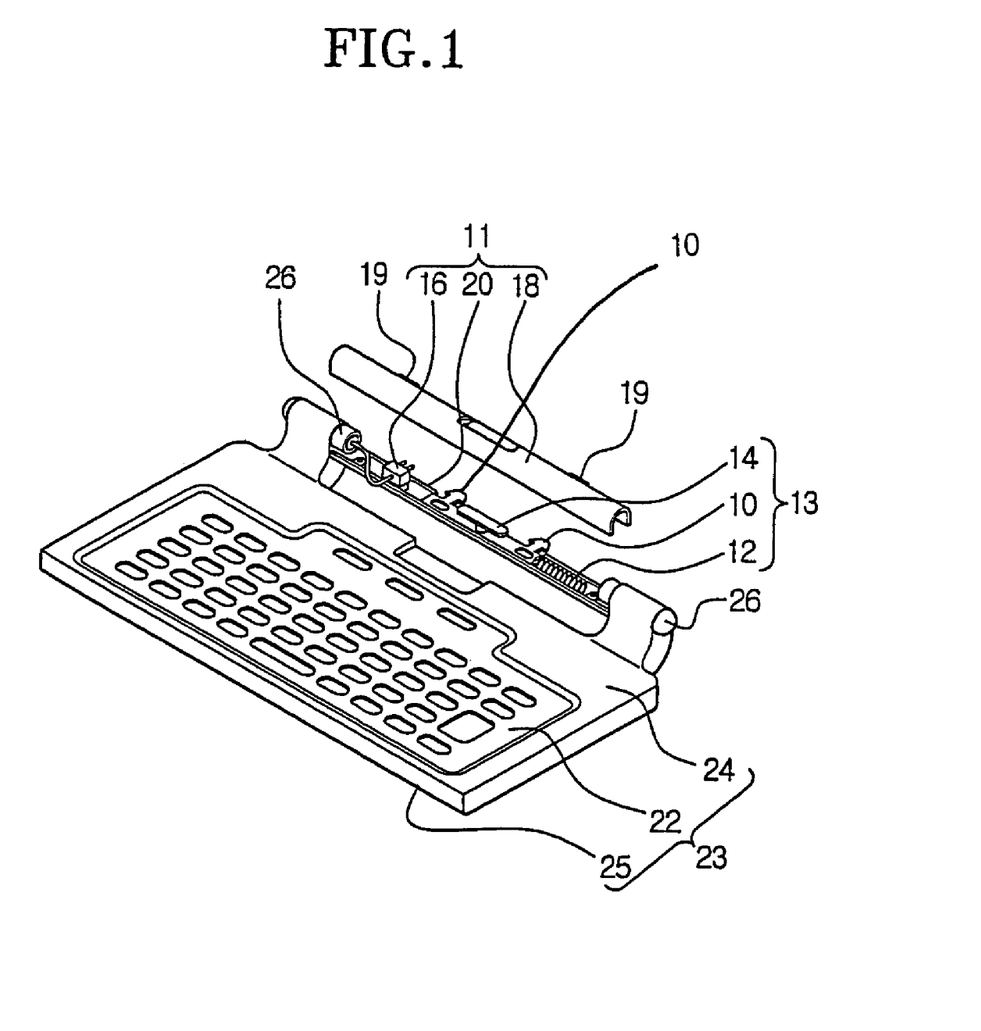
FIG. 1 is an exploded perspective view showing a keyboard of a PDA according to an embodiment of the present invention.

FIG. 1 is an exploded perspective view showing a keyboard of a PDA according to an embodiment of the present invention.

As shown in FIG. 1, the keyboard for a PDA according to this embodiment can be divided into a hinge unit 11, a keyboard body 23 and a connection unit 13.

The hinge unit 11 includes an upper cover 18 having two guide protrusions 19, a lower cover 20, a pin contact connector 16 and a pipe hinge 26.

The connection unit 13 comprises two bracket hinges 10 placed inside of the hinge upper cover 18 and inserted into the PDA, a spring 12 disposed at the side of the bracket hinges 10 and an ejector 14 placed between the bracket hinges 10.

The keyboard body 23 includes an upper keyboard case 24, a lower keyboard case 25, a typing board 22 and a keypad (not shown) placed inside of the upper and lower keyboard cases 24 and 25. The keyboard body 23 covers the outer circumference of the pipe hinge 26 of the hinge unit 11 so that the keyboard body 23 is connected with the hinge unit 11.

The pin contact connector 16 has a plurality of protruding pins that can be contracted, and is connected with the keypad (not shown) having the keyboard body 23 and transmits a signal input into the keypad to the PDA.

An example of a distinguishing aspect of the keyboard of a PDA according to the embodiments of the present invention is that the keyboard can be attached to the PDA in both the front and back directions. When a user wants to use the keyboard of the PDA shown in FIG. 1, the user has the two bracket hinges 10 disposed on the hinge unit 11 inserted into the PDA in association with the guide protrusions 19 formed on the upper cover 18. Then, the spring 12 at the side of the bracket hinge 10 pushes the bracket hinge 10 to one side, thus the bracket hinges 10 are locked to the PDA.

Figure 2:
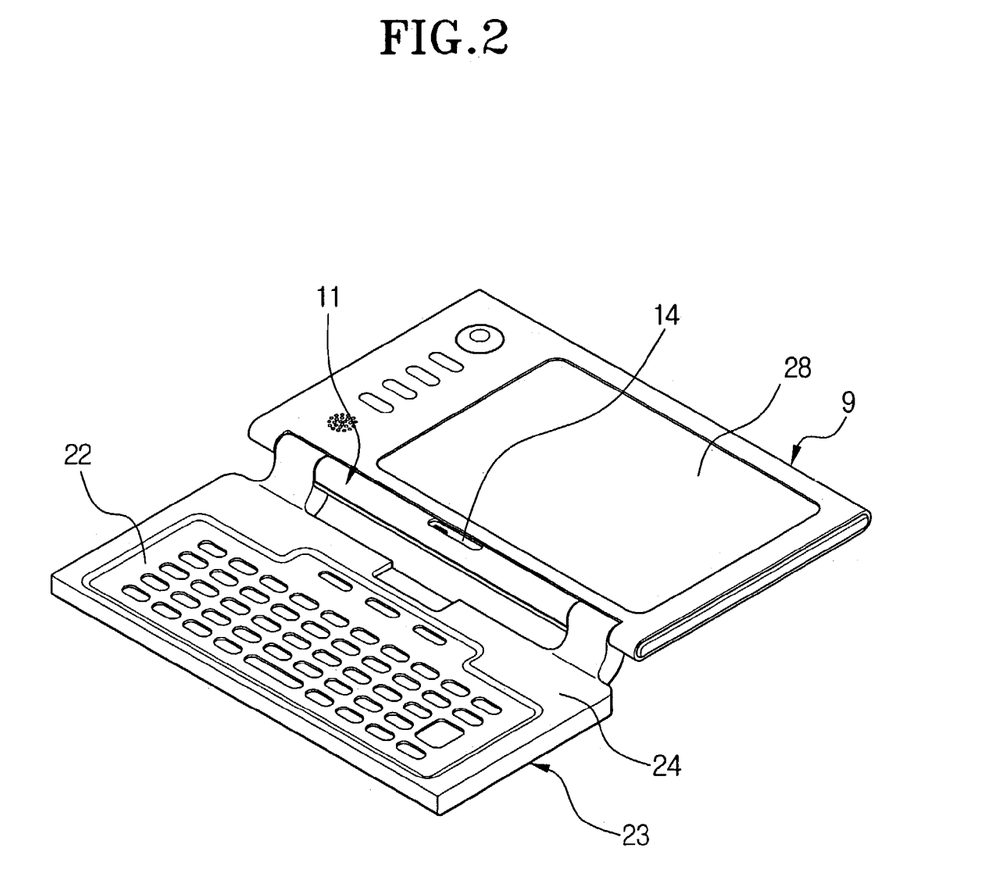
FIG. 2 is a perspective view showing the keyboard of FIG. 1, being attached in the front direction to the PDA and spread for 180°.

FIG. 2 is a perspective view showing the keyboard of FIG. 1, which is attached in the front direction to the PDA and spread out at 180°.

When the keyboard is attached in the front direction to be used, the pin contact connector 16, connected with the FPC keypad placed at the keyboard body 23, is connected with a signal terminal (not shown) of the PDA 9 so that the signal input into the keyboard can be transmitted to the PDA 9. Moreover, the keyboard can be folded and unfolded about the hinge unit 11.

When the user does not want to use the keyboard, but touches an LCD screen 28 of the PDA 9 instead, the keyboard according to this embodiment can be separated from the PDA 9 and kept separately. Moreover, the keyboard can be attached in the back direction by turning the bracket hinges 10 of the hinge unit 11 and folding it towards the back of the PDA 9.

Figure 3A:
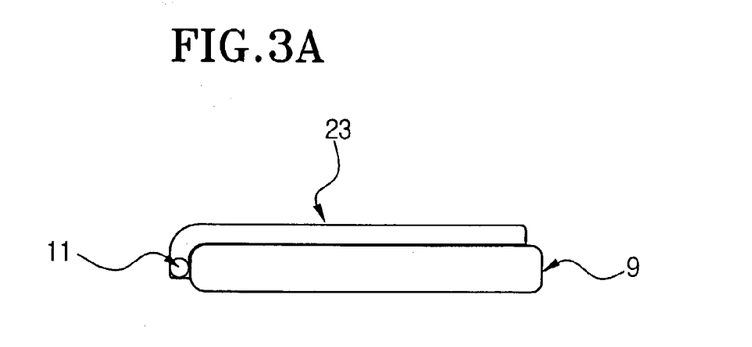
FIG. 3A is a view showing the keyboard of FIG. 1 being attached in the front direction and folded on the screen of the PDA.
Figure 3B:
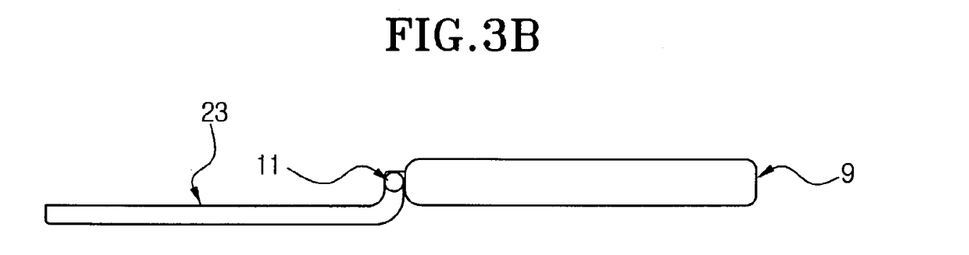
FIG. 3B is a view showing the keyboard of FIG. 1 being attached in the front direction and spread for 180° to a using position.
Figure 3C:
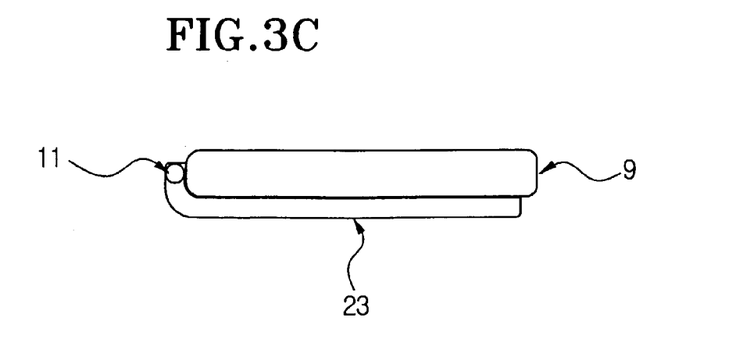
FIG. 3C is a view showing the keyboard of FIG. 1 being attached in the back direction and folded up to the back of the PDA.

FIGS. 3A, 3B and 3C are views showing the keyboard of the PDA 9 according to this embodiment of the present invention. FIG. 3A is a view showing the keyboard attached in the front direction and folded to the screen of the PDA 9. FIG. 3B is a view showing the keyboard attached in the front direction and spread out at 180°. FIG. 3C is a view showing the keyboard attached in the back direction and folded to the back of the PDA 9 when not in use.

As described above, the keyboard according to this embodiment can be attached in front and back directions, and folded to the screen or to the back of the PDA 9. Thus, when the user wants to use the screen only, in addition to the option of separating the keyboard and keeping it in the safe place, the user also can have the option of attaching the keyboard in the back direction and having the keyboard folded up to the back especially when the user is on the move or when it is difficult to separate the keyboard. Therefore, it is more convenient for the user to use the PDA 9.

FIGS. 4 through 7 are views showing a keyboard used with a PDA according to another embodiment of the present invention.

Figure 4:
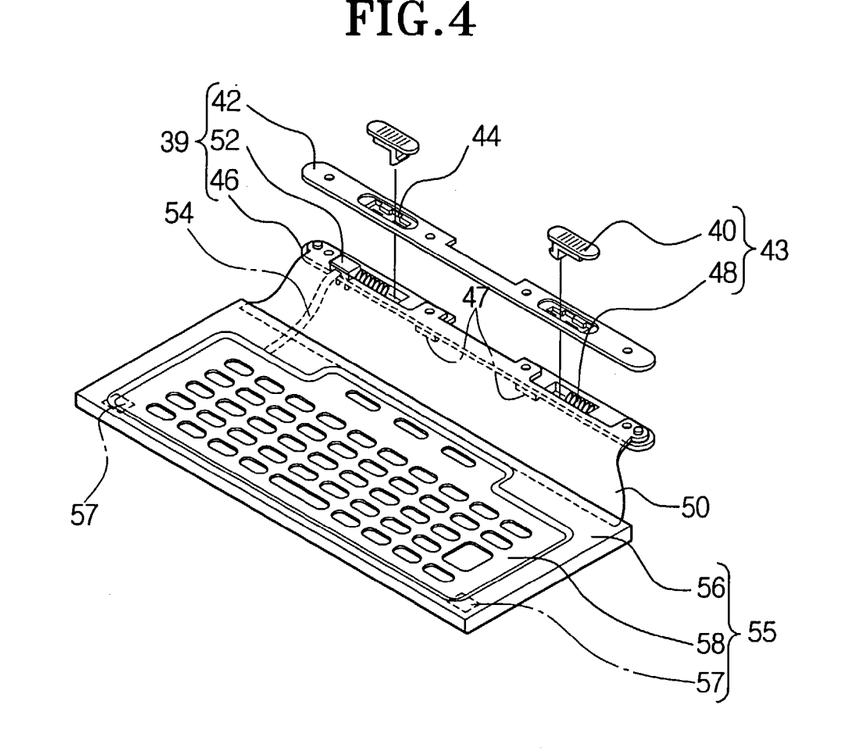
FIG. 4 is an exploded perspective view showing a keyboard of a PDA according to another embodiment of the present invention.

Referring to FIG. 4, the keyboard includes a hinge unit 39, a keyboard body 55, a keyboard rotation unit 50 made of leather or cloth having good flexibility in order to rotate 360° in the front and the back directions, a pin contact connector 52 to transmit a keyboard input signal, and connection units 43.

The hinge unit 39 includes an upper hinge cover 42 having cover holes 44, a lower hinge cover 46 having guide protrusions 47, and the pin contact connector 52.

The connection units 43 include hook hinges 40 and springs 48 to push the hook hinges 40 to be automatically locked to the PDA.

The keyboard body 55 includes a typing board 58, a keyboard body case 56, a keypad (not shown) placed inside of the keyboard body case 56, and a magnet 57 to maintain the status of the keyboard being attached when the keyboard is folded in the front or the back direction and stored.

The pin contact connector 52 is connected with the keypad through a connection member 54, and transmits the keyboard input signal to the PDA. As the connection member 54 passes through the inside of the keyboard rotation unit 50, materials with good flexibility and durability are used for the connection member 54.

Figure 5:
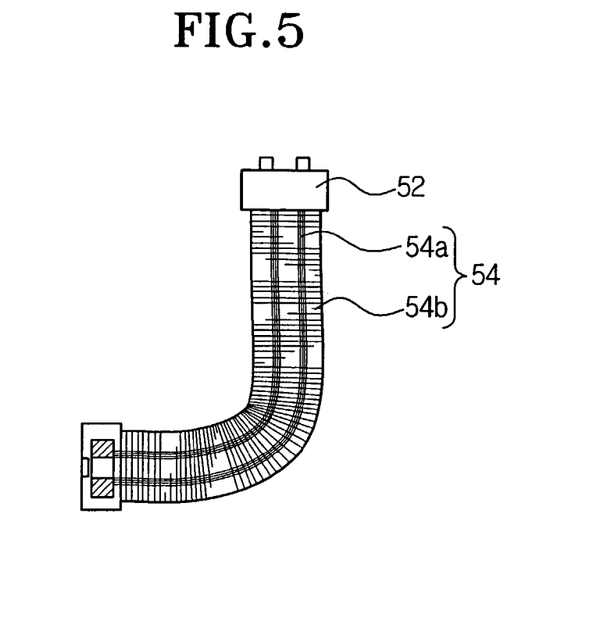
FIG. 5 is an extracted schematic view showing a connection member that connects a keypad and a connector and transfers a signal input from the keyboard according to the embodiment of FIG. 4.

FIG. 5 is an enlarged view schematically showing the connection member 54. As shown in FIG. 5, the connection member 54 has a conductive tape 54a made of thin fiber material provided therein, and a protective film 54b wrapping the conductive tape 54a. The protective film 54b is made of urethane foam.

As the connection member 54 has the above structure, the connection member 54 has enough flexibility and durability. Moreover, the connection member 54 can rotate 360° like the keyboard rotation unit 50, and signals can be easily transmitted.

Figure 6:
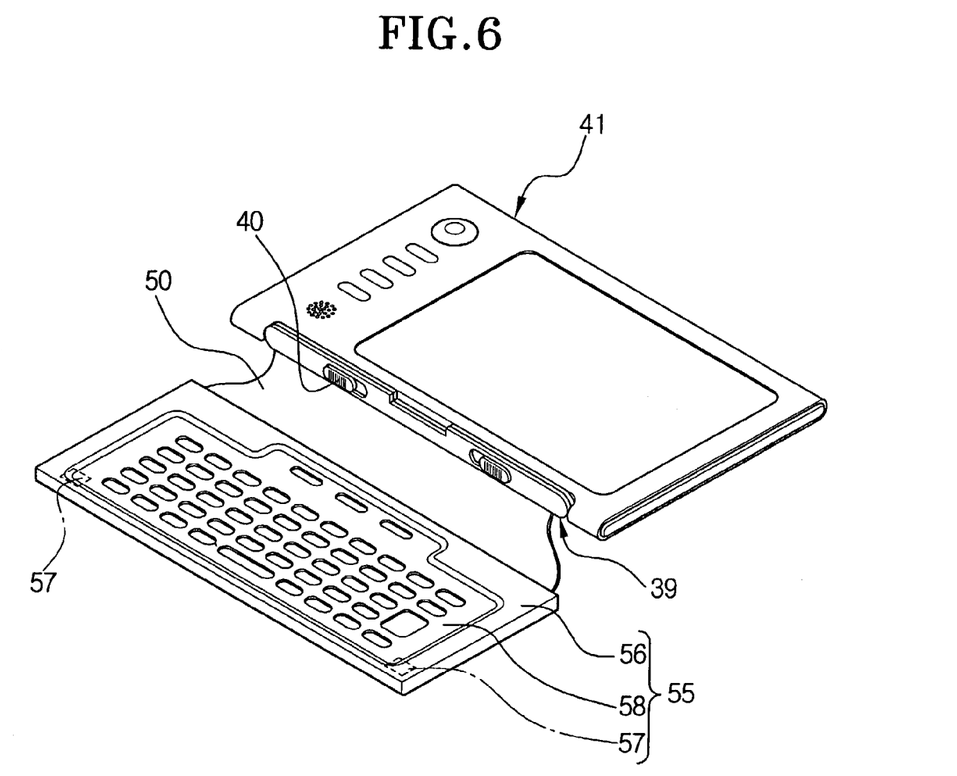
FIG. 6 is a perspective view showing the keyboard of FIG. 4 being attached in the front direction to the PDA.
Figure 7A:
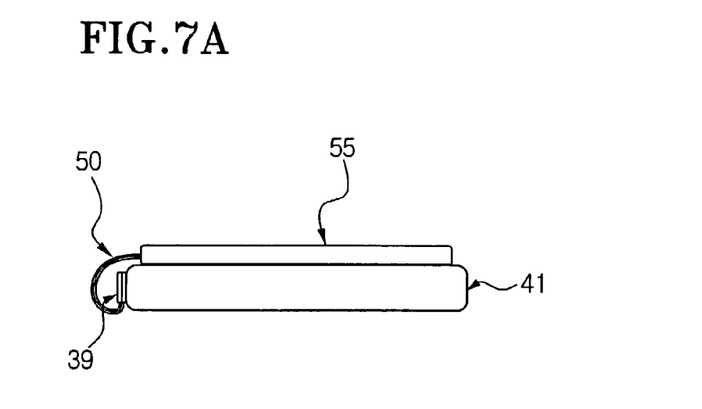
FIG. 7A is a view showing the keyboard according to the embodiment of FIG. 4 being attached on the screen of the PDA and in a closed position.
Figure 7B:
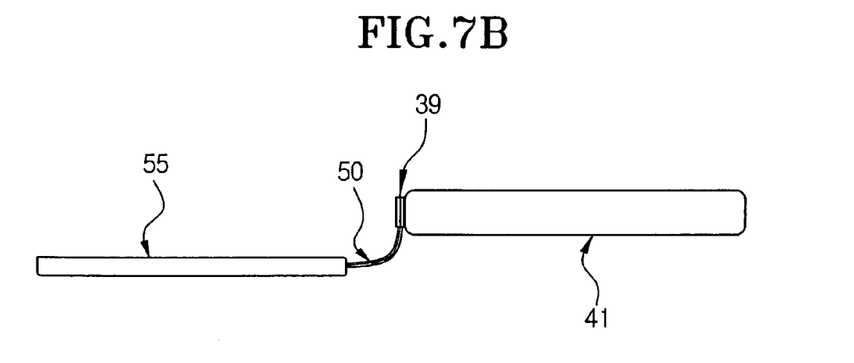
FIG. 7B is a view showing the keyboard according to the embodiment of FIG. 4 being spread out at 180° to be used.
Figure 7C:
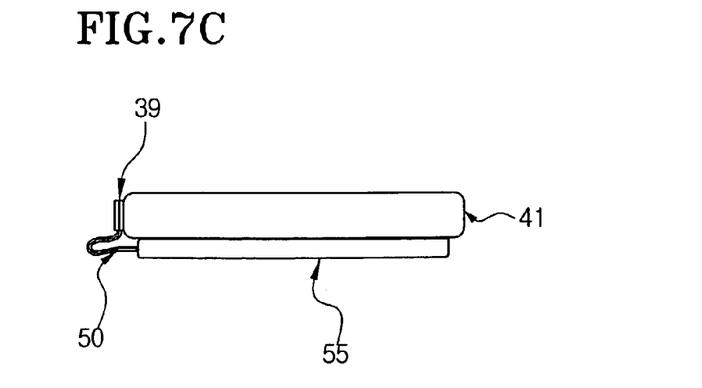
FIG. 7C is a view showing the keyboard of FIG. 4 being attached at the back of a PDA when not in use.

FIG. 6 is a perspective view showing another embodiment of the present invention. In FIG. 6, the keyboard is attached in the front direction to be used. FIGS. 7A, 7B and 7C are views showing the keyboard attached in the front direction and folded or unfolded.

In other words, the connection and usage of the keyboard to the PDA 41 according to this embodiment is as follows: the user moves the hook hinges 40 of the connection units 43 to a direction of compressing the springs 48 and inserts the guide protrusions 47 into insertion holes (not shown) of the guide protrusions 47. Then, as the user unhands the hook hinges 40, the hook hinges 40 are returned to their initial position by the recovering force of the springs 48 and locked in the PDA 41.

As described before, when the hook hinges 40 are attached in the front direction, the pin contact connector 52 is connected with the signal terminal (not shown) of the PDA 41, and transmits the input signal of the keyboard to the PDA 41.

Moreover, when the user does not use the keyboard, the keyboard can be attached in the back direction to the PDA 41 in the same manner.

FIG. 7A is a view showing the status of the keyboard according to this embodiment attached in the front direction, and folded to the screen of the PDA. FIG. 7B is a view showing the keyboard unfolded to be used. FIG. 7C is a view showing the keyboard attached on the back of the PDA when the user uses the PDA by touching the screen of the PDA.

The keyboard according to the embodiments of the present invention can be rotated at 360° with the keyboard being attached in the front or the back direction, thus the keyboard can be attached on the screen or on the back of the PDA.

The keyboard according to the embodiments of the present invention for a PDA can be attached in the front direction or the back direction to the PDA set, and separated after use. Therefore, the keyboard can be more easily used and kept.

In addition, as the keyboard according to the embodiments of the present invention has a simplified hinge unit that is inserted and locked to the PDA, the keyboard can be easily connected with and separated from the PDA.

Furthermore, as the keyboard according to the embodiments of the present invention can be attached on the screen of the PDA, there is no need to provide a cover to protect the screen.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A keyboard attached to a personal digital assistant (PDA) set, comprising:
    hinge means having a connector to transmit a keyboard input signal to the PDA, and upper and lower hinge covers;
    a connection unit placed inside of the hinge means and attachable in a front direction and a back direction to the PDA such that the PDA can face toward or away from the keyboard; and
    a keyboard body connected with the hinge means, folded and unfolded about the hinge means, having a typing board on an upper side and a keypad formed therein to input a key pressed on the typing board, the hinge means being detachably disposed within the PDA between projections on opposite ends of a side of the PDA opposite the keyboard body and directly connected to the keyboard body, a portion of the keyboard body being rounded so that the keyboard body is folded against a screen of the PDA when attached in the front direction, and against a back of the PDA when attached in the back direction.

2. The keyboard of claim 1, wherein the connection unit comprises:
    a bracket hinge inserted into the PDA in order to fix the hinge means;
    a spring to elastically bias the bracket hinge toward a side so that the bracket hinge is automatically locked to the PDA when the bracket hinge is inserted into the PDA; and
    an ejector to release the lock of the bracket hinge by compressing the spring.

3. The keyboard of claim 1, wherein the connector is a pin contact connector connected with the keypad.

4. The keyboard of claim 3, further comprising a pipe hinge to prevent the keyboard body from being worn by the friction with the fixed hinge means when the keyboard is folded and unfolded about the hinge means.

5. The keyboard of claim 1, wherein the upper hinge cover has a guide protrusion to inform an attaching position to the PDA.

6. The keyboard of claim 5, further comprising a pipe hinge to prevent the keyboard body from being worn by the friction with the fixed hinge means when the keyboard is folded and unfolded about the hinge means.

7. The keyboard of claim 1, further comprising a pipe hinge to prevent the keyboard body from being worn by the friction with the fixed hinge means when the keyboard body is folded and unfolded about the hinge means.

8. The keyboard of claim 1, wherein the keyboard body further comprises an arm extending towards the PDA to support the PDA above the keyboard when the PDA is in use, the hinge unit-means being disposed within the arm.

9. The keyboard of claim 1, wherein the keyboard and the PDA set rotate relative to each other about a single axis parallel to a face of the screen.

* * * * *

UNITED STATES PATENT AND TRADEMARK OFFICE
CERTIFICATE OF CORRECTION

| | | |
|---|---|---|
| PATENT NO. | : 6,976,799 B2 | Page 1 of 1 |
| APPLICATION NO. | : 10/385744 | |
| DATED | : December 20, 2005 | |
| INVENTOR(S) | : Young-ki Kim et al. | |

It is certified that error appears in the above-identified patent and that said Letters Patent is hereby corrected as shown below:

On the Front Page: Field (56), Column 2, Other Publications, line 2, delete second "," (comma);

Column 6, line 58, replace "unit-means" with --means--, therefor.

Signed and Sealed this

Twenty-fifth Day of July, 2006

JON W. DUDAS
*Director of the United States Patent and Trademark Office*